No. 29,125. H. H. EVARTS. PATENTED JULY 10, 1860.
MACHINE FOR SAWING STAVES.
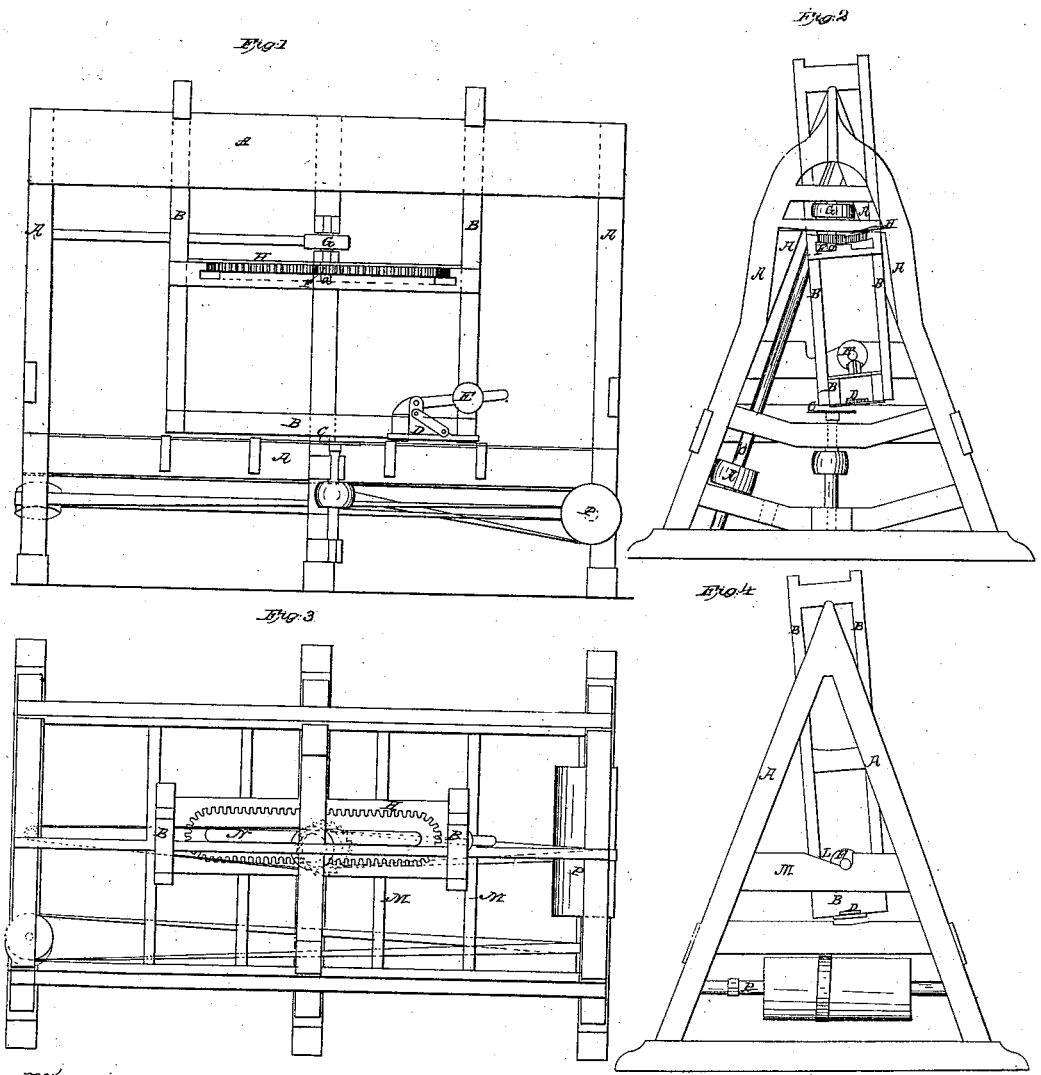

UNITED STATES PATENT OFFICE.

HARRY H. EVARTS, OF CHICAGO, ILLINOIS, ASSIGNOR TO HIMSELF AND PHINEAS E. MERRIHEW, OF SAME PLACE.

MACHINE FOR SAWING STAVES.

Specification of Letters Patent No. 29,125, dated July 10, 1860.

*To all whom it may concern:*

Be it known that I, HARRY H. EVARTS, of Chicago, in the county of Cook and State of Illinois, have invented a new and useful Improvement in Machinery for Sawing Staves; and I do hereby declare that the following is a full, clear, and exact description of the same, of its construction and operation, reference being had to the annexed drawings, forming part of this specification.

Figure 1 is a longitudinal section; Fig. 2 a transverse section. Fig. 3 is a plan and Fig. 4 an end elevation.

Similar letters of reference indicate corresponding parts in all the figures.

My improved stave machine is intended to saw crude staves from the block with a circular saw. These staves will be straight transversly from the edge to the center but the line of their surfaces meet in the center of the stave at such an angle as will cause the least waste of thickness in planing the outer and inner surfaces to a convex and concave form. It is designed to saw on each side of the block as far as the center of the stave so that two cuttings are required to separate the stave from the block but as one side is cut by the forward motion of the carriage and the other by the return or backward movement and as the carriage is made to glide smoothly around the end of the movements no time will be lost in the operation. The crude staves thus produced require to be planed to the proper form to prepare them for the market or use.

To enable others skilled in the art to make and use my invention I will proceed to describe its construction and operation.

A A A A, are pieces of the frame; B B B the reciprocating and vibrating block carriage; C, saw.

D is the dog which holds the block to be sawed; E, a weighted lever which forces the dog into the block and holds it during the process of sawing; F, pinion fastened to shaft *a*.

G is a pulley fastened to pinion shaft *a*.

H is a rack with straight parallel sides and curved or concave ends, having internal teeth into which works the pinion F; K the pulley on the inclined shaft which receives the motion from the counter shaft reduces the speed and transmits it to pulley G through the inclined shaft and belt.

L is an inclined plane over the lower part of which the handle end of weighted lever is brought by the backward movement of the carriage and up which the lever is raised by the curvilateral motion of the block carriage thus withdrawing the dog from the block and permitting it to fall upon the gages M M which gage the thickness of the stave. As soon as the carriage moves forward the weight is withdrawn from the plane and falls and dogs the block for the sawing of another stave.

N shows the guide for the end of the pinion shaft *a*, which keeps the pinion in gear with the rack.

O is the inclined shaft; P, counter shaft and drum.

The center of oscillation of the carriage must be sufficiently distant from the saw to produce the desired form of the stave, so as to save timber.

The object of this invention is to enable us to use the circular saw as the most economical of all saws to saw staves in such form that the waste of timber will not be an objection to their use. Hence the necessity of making the angle right to suit the curve to which the staves are to be finished. What that angle shall be depends upon the curve to which they are to be finished and upon the width of the staves. This can be ascertained readily by any one skilled in the art.

The operation of my stave machine is as follows: I place a block upon the block carriage. Motion being communicated to the saw in the ordinary way, and to the rack and carriage through the mediums of belt shaft O and pinion F, it will be seen that when the weighted lever is lifted by the inclined plane L the block will drop onto the gages, be fastened by the falling of the weight as the carriage moves on and as it passes forward to the left of the saw the right hand side of the stave will be sawed and as the carriage passes the block partially around the saw and returns on the right side thereof the left side of the stave will be sawed and thus completely severed from the block. And as it passes (*i. e.* the carriage) over to the left the block is dropped again to the gages, again dogged and the same process of sawing continued.

What I claim as my invention and desire to secure by Letters Patent is—

The combination of the vibrating and reciprocating carriage with the circular saw as described and for the purposes set forth in the specification.

HARRY H. EVARTS.

Witnesses:
H. L. BARNEY,
EDWARD S. EVARTS.